Oct. 15, 1963  N. C. SCHUTT  3,107,078
FILM SUPPORT FOR PHOTOMECHANICAL CAMERA
Filed June 29, 1960  2 Sheets-Sheet 1
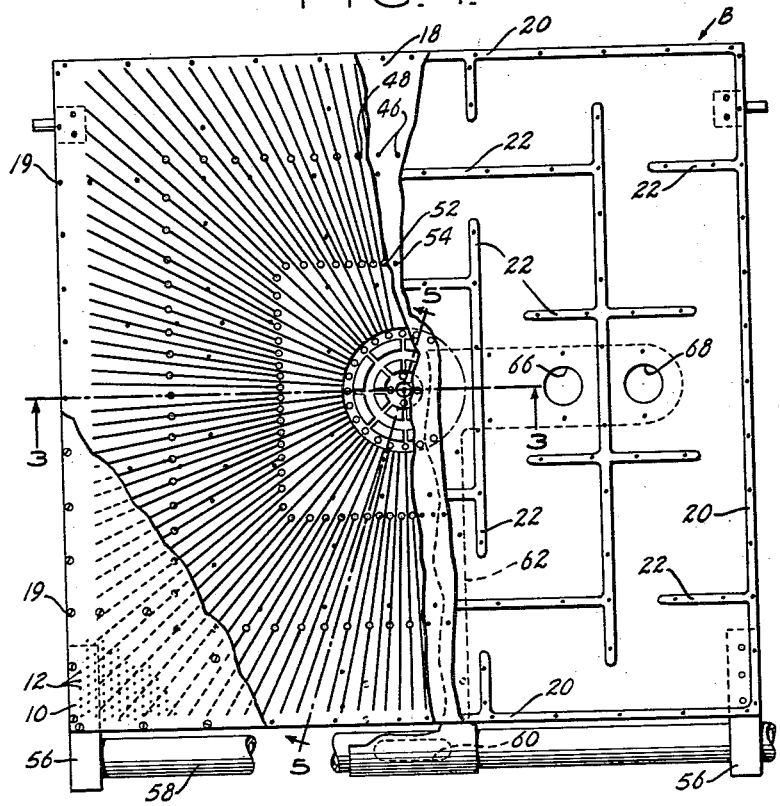
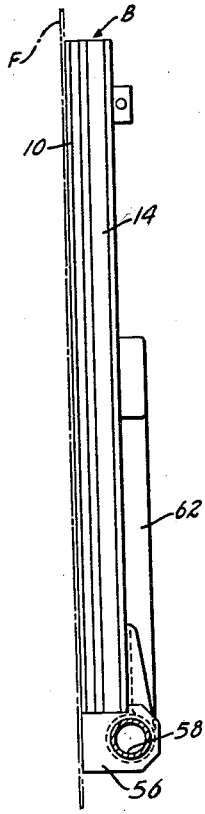
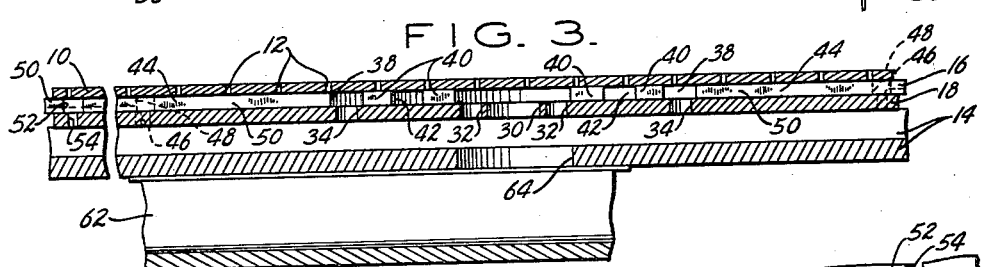
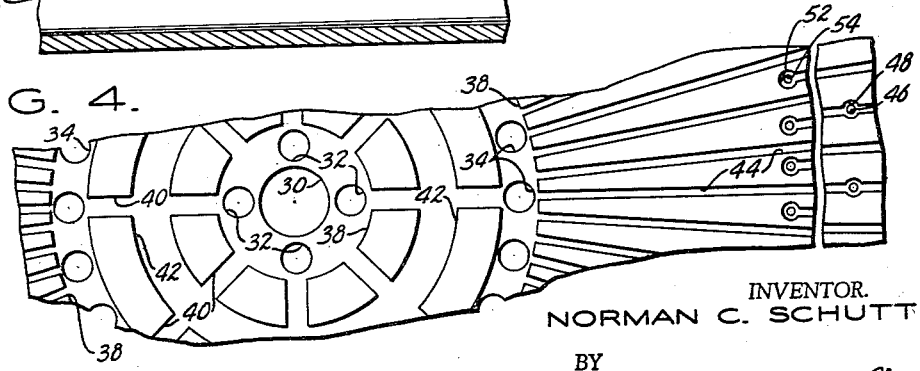
INVENTOR.
NORMAN C. SCHUTT
BY
Morgan, Finnegan, Durham & Pine
ATTORNEYS Oct. 15, 1963 N. C. SCHUTT 3,107,078
FILM SUPPORT FOR PHOTOMECHANICAL CAMERA
Filed June 29, 1960 2 Sheets-Sheet 2

INVENTOR.
NORMAN C. SCHUTT
BY
Morgan, Finnegan, Durham & Pine
ATTORNEYS

United States Patent Office 3,107,078
Patented Oct. 15, 1963

3,107,078
FILM SUPPORT FOR PHOTOMECHANICAL CAMERA
Norman C. Schutt, Glen Cove, N.Y., assignor to Powers Chemco, Inc., Glen Cove, N.Y., a corporation of New York
Filed June 29, 1960, Ser. No. 39,496
4 Claims. (Cl. 248—363)

The present invention relates to film supports for use with large photomechanical cameras. More particularly, this invention relates to a vacuum support for maintaining a film sheet in the focal plane of the camera.

Objects and advantages of the invention will be obvious herefrom, or may be learned by practice with the invention, the same being realized and attained by means of the instrumentalities and combinations pointed out in the appended claims.

The invention is characterized by the provision of a film sheet support including a laminated board adaptable for use with various sizes of film for maintaining the film sheet smooth and wrinkle-free and properly disposed in the focal plane of the associated camera. The laminar board is movably mounted for travel from a generally horizontal film loading position to a generally vertical film exposure position. If desired, film can be applied to the board while it is in vertical position.

The outer or face plate of the board is provided with a plurality of suction outlets for engaging the film sheet and maintaining it thereagainst. The rear plate of the board is provided with a vacuum or suction manifold chamber at the rear thereof and has internal cooperating plates, which form a plurality of limited accesses of the face plate with the manifold chamber.

The vacuum in the manifold chamber is directed by suitable openings in the internal plates from the vacuum source radially from an inlet section at the center of the board to the extremities thereof. The central location of the suction outlet and the radial disposition of the suction force over the face plate insures adequate distribution of the suction force to the entire film sheet. Further, the radial symmetrical arrangement from a central inlet section is effective to maintain the length of suction distribution at a minimum while providing zones of decreasing suction pressures in concentric sections radiating outwardly from the center of the board to the extremities.

A film sheet disposed adjacent the face plate of the board is engaged firmly at the center thereof since the air pressure on the face of the film is greater than that on the back of the film. However, the suction pressure progressively decreases outwardly from the center of the board, drawing the film sheet smoothly and evenly against the sheet concentrically outwardly from the center, reducing the possibility of wrinkling or misalignment of the film sheet.

It is therefore an object of the present invention to provide an improved vacuum board for supporting various sizes of vertically disposed film sheets in the focal plane of the camera.

Another object of the present invention is to provide an improved vacuum board wherein the suction pressure is greatest at the center thereof and decreases in concentric zone of suction pressure outwardly toward the extremities of the board.

A further object of the present invention is to provide a pivotally-mounted vacuum board of laminar construction wherein the suction pressure is conducted from a suction inlet at the center of the board radially outwardly toward the extremities thereof.

The invention consists in the novel parts, constructions, arrangements, combinations, and improvements herein shown and described.

The accompanying drawings, referred to herein and constituting a part hereof, illustrate one embodiment of the invention and together with the description, serve to explain the principles of the invention.

FIGURE 1 is a front view of a vacuum board embodying the present invention with portions thereof broken away to show details of the laminar construction thereof.

FIGURE 2 is a side elevation of the vacuum board illustrated in FIGURE 1.

FIGURE 3 is a sectional view taken along line 3—3 of FIGURE 1.

FIGURE 4 is a detailed view of the suction distribution system of the board illustrated in FIGURE 1.

Figure 5:
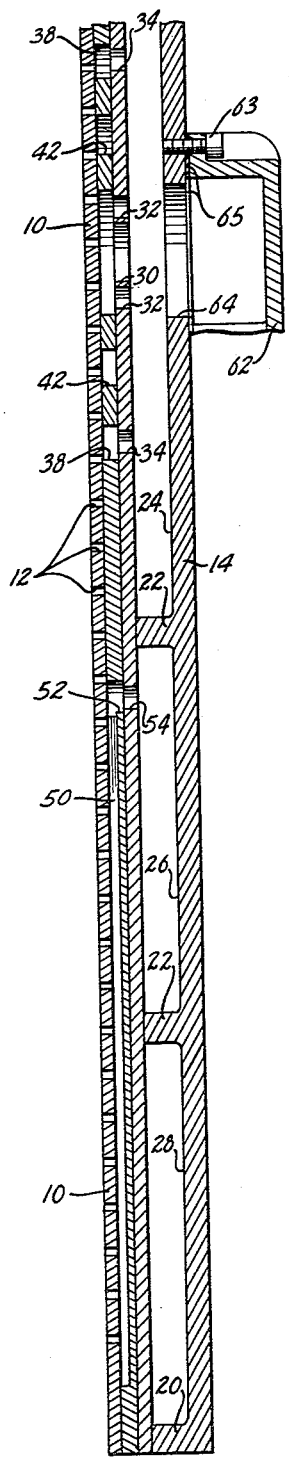
FIGURE 5 is a sectional view taken along line 5—5 of FIGURE 1.

Referring to the drawings, there is illustrated a vacuum board designated generally B incorporating the preferred embodiment of the invention. Board B includes a face plate 10 provided over its entire surface with closely spaced small diameter openings 12. Plate 10 is adapted to receive film sheet F over the front thereof as shown in FIGURE 2.

Board B is preferably of laminated construction and includes a back plate 14 and a pair of intermediate contiguous plates 16 and 18 with plate 16 positioned adjacent the inside surface of face plate 10 and plate 18 positioned between plate 16 and the inside face of back plate 14. To form board B, plates 10, 14, 16, and 18 are suitably secured together by means of machine screws 19.

Figure 6:
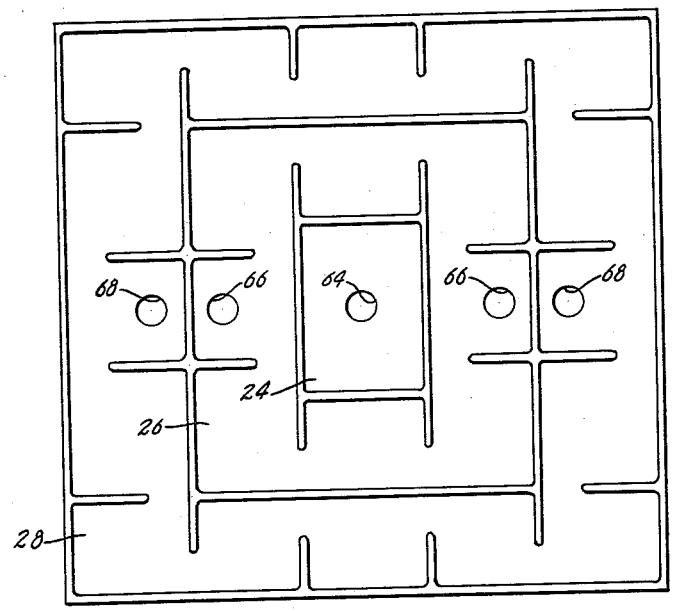
FIGURE 6 is a front view of the back plate of the vacuum board.

The vacuum distribution manifold is formed in board B by providing transversely extending edge portions 20 and rib sections 22 on back plate 14. As shown in FIGURE 6, rib sections 22 are formed into generally nested rectangular configuration. In assembled position, rib sections 22 and edge portions 20 are urged into air-tight engagement with plate 18, forming a series of separate, nested manifold chambers 24, 26 and 28 therebetween.

Plate 18, in turn, has formed therein a central aperture 30, a plurality of spaced concentric openings 32 adjacent thereto and a second concentric group of separate openings 34 spaced therefrom, openings 30, 32 and 34 providing communication between manifold chamber 24 and the face of plate 18 remote therefrom.

Likewise, plate 16 is provided with a central opening 36 which coacts with aperture 30 and openings 32 to furnish a vacuum force from manifold chamber 24 to the center of board B. In addition, plate 16 has an annular opening 38 therein communicating with opening 34. Openings 36 and 38 in plate 16 are connected by a plurality of short radial channels 40 which connect openings 36 and 38 through an interim concentric annular channel 42. Thus, a vacuum force from manifold chamber 24 is supplied to the center of face plate 10 of board B.

To distribute the vacuum to the peripheral portions of face plate 10, plate 16 is provided with a plurality of spaced, elongated radial channels 44 which extend from annular opening 38 outwardly to the edges of face plate 10 and which are open to face plate 10. Since the distance from opening 38 to the edges of face plate 10 is relatively long, means is provided for ensuring adequate suction pressure at the extremities of channels 44. To accomplish this, plate 18 is provided with a plurality of passages 46 therethrough which communicate with outer manifold chamber 28. Each channel 44 in plate 16, in turn, is provided with a bore 48 which cooperates with one of the passages 46 to admit suction from manifold 28 to its associated channel 44. This arrangement ensures a substantially uniform pressure gradient radially along the entire length of channel 44.

As described hereinabove, channels 44 divulge radially from opening 38 toward the peripheral edges of board B. It will be understood that the distance between adjacent channels 44 thus is greater toward the outer edges of the board than at the central portions thereof. To provide proper suction at these outer edges where channels 44 are relatively widely spaced apart, there is provided in plate 16 additional intermediate channels 50 disposed between channels 44. Each channel 50 extends from a bore 52 in plate 16 radially between channels 44 to the outer peripheral portions of face plate 10. Bores 52, in turn, are each associated with a passage 54 through plate 18 which forms restricted communication between manifold chamber 26 and channels 50. Preferably, however, the total suction area represented by channels 44 and 50 is comparatively low compared to the area at the center of board B represented by openings 30—38.

To support laminated vacuum board B, there is preferably provided a pair of side brackets 56, each secured to one side and at the bottom edge of back plate 14 and downwardly depending therefrom. A tubular member 58 is secured to side brackets 56 and is mounted for rotation at its free end (not shown) thereby adapting board B for movement from a generally horizontal film-loading position to the generally vertical film-exposure position shown in FIGURE 2.

If desired, however, film F may be disposed adjacent face plate 10 when board B is already positioned in vertical disposition.

Figure 7:
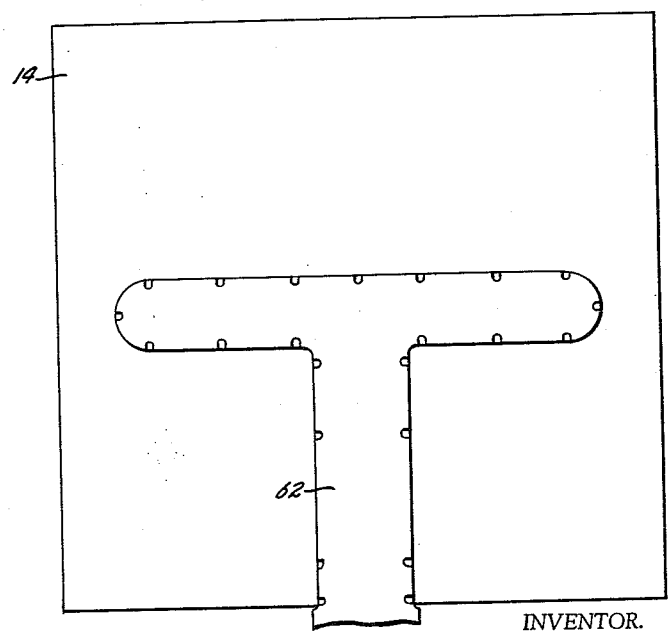
FIGURE 7 is a rear view showing the exposed face of the back plate of the vacuum board.

Tubular member 58 is provided midway between brackets 56 with an elongated slot 60 which communicates with a hollow T-shaped suction conduit 62. Conduit 62 in turn is secured in sealing engagement by screws 63 and gasket 65 with the exposed face of back plate 14. As shown best in FIG. 7, conduit 62 extends upwardly from tubular member 58 to a central passage 64 in plate 14 which communicates with manifold chamber 44. In like manner, conduit 62 extends across back plate 14 to spaced openings 66 and 68 which communicate with each side of manifold chambers 26 and 28 respectively (see FIGS. 6 and 7).

In operation, board B may be rotated to the horizontal film-loading position and a sheet of film F placed onto face plate 10. It will be understood that film sheet F is centrally positioned on face plate 10 such that at least the central openings 36 and 38 in plate 14 are covered no matter what size sheet of film is positioned for exposure. When the film sheet F is in position on face plate 10, suction from a suitable source of supply (not shown) is fed into tubular member 58 through conduit 62 to manifold chambers 24, 26, and 28.

In a vacuum board embodying the present invention the board will be approximately 32½" wide by 30½" high with openings 12 in face plate 10 being approximately .086" in diameter on 9/64" center-to-center. Channels 44 are approximately ⅛" square with intermediate channels 50 being ⅛" wide by 1/16" deep with the open faces exposed to face plate 10. Bores 48 and 52, in turn, may be ¼" in diameter with passages 46 and 54 through plate 18 approximately .113" in diameter. Openings 64, 66 and 68, which communicate with conduit 62, and manifold chambers 24, 26, and 28 respectively, may be 2" in diameter. Opening 30 is preferably ¾" in diameter while openings 32 are approximately four in number and ⅜" in diameter spaced on a 1¼" diameter circle. In like manner, openings 34 are approximately 24 in number of ⅜" diameter spaced on a 5¼" in diameter circle. In turn, opening 36 in plate 16 is preferably 1¾" in diameter while annular opening 38 is preferably ½" wide.

Thus, the total open area exposed to face plate 10 through plate 16 is substantially more at the center of the board than is presented thereto beyond annular opening 38.

The suction admitted into manifold chambers 24, 26 and 28 is conducted through plates 16 and 18 and openings 30—38 and channels 44 and 50 to openings 12 in face plate 10. Thus, film sheet F is drawn into engagement with board B from the central section outwardly in smooth, even concentric sections, the suction distribution arrangement ensuring wrinkle-free application of the film sheet F to board B.

With the film sheet F smoothly in position thereon board B is travelled by suitable rotating member 58 from a horizontal film loading position into generally vertical film exposure position.

If film F is to be applied while board B is in vertical disposition, the suction force is actuated when film F has been suitably positioned in front of plate 10.

It will be understood that radial channels 44 and 50 and their associated bores and passages are relatively small compared to openings 30—38. Thus, any suction leakage through channels 44 and 50 is held to a minimum.

What is claimed is:

1. A vacuum type sheet support for use with a photographic camera comprising a face plate having a plurality of closely spaced openings distributed thereover for applying a suction force to a sheet of film for maintaining it thereagainst in the focal plane of said camera, a back plate, means mounting said back plate in spaced cooperating relationship with said face plate, rib sections on said back plate forming at least three internested, generally concentric, separate manifold chambers between said face and back plates, a suction conduit, means mounting said conduit across the middle of said back plate, means communicating said conduit and each of said manifold chambers for supplying suction substantially simultaneously to each of said chambers, a first internal plate, means mounting said first plate in abutting relationship with the rear of said face plate, a second internal plate, means mounting said second plate between said first internal plate and said back plate, said first and second internal plates provided with concentric cooperating apertures at the central portion thereof for forming a central access chamber communicating the central portion of said face plate with the innermost of said manifold chambers, first channels formed in the first internal plate and extending from said central access chamber radially for conducting suction from said innermost manifold chamber to substantially the entire of said face plate, said first channels being defined by said first plate and said second internal plate and constructed and arranged symmetrically in said first internal plate, opposed channels being of substantially the same length, a plurality of second channels formed radially in said first internal plate and disposed between said first channels extending from a point remote from said central access chamber to the extremities of said face plate, means associated with each of said second channels for communicating said second channels directly with the intermediate manifold chamber, and passages operatively interconnecting the outermost manifold chamber with each of said first channels at an intermediate point in the length of said channels, said first and second channels cooperating to supply suction symmetrically to said face plate in zones of concentric, substantially equal pressures.

2. The invention as defined in claim 1, wherein said first and second internal plates are provided with concentric cooperating apertures for forming separate inner and outer concentric access chambers communicating the central portion of said face plate with the innermost manifold chamber.

3. The invention as defined in claim 1, wherein said manifold chambers are of substantially rectangular configuration.

4. The invention as defined in claim 1, including means mounting said support for movement from a generally horizontal film loading position to a generally vertical film exposure position.

References Cited in the file of this patent
UNITED STATES PATENTS

| | | |
|---|---|---|
| 2,519,610 | Sussin | Aug. 22, 1950 |
| 2,895,706 | Blatherwick | July 21, 1959 |
| 2,914,289 | Schutt | Nov. 24, 1959 |
| 2,933,014 | Anander | Apr. 19, 1960 |